United States Patent [19]

Stuckmann et al.

[11] Patent Number: 5,219,263
[45] Date of Patent: Jun. 15, 1993

[54] TRANSPORTER, ESPECIALLY FOR TRANSPORTING A WORKPIECE BETWEEN PRESSES

[75] Inventors: Otto Stuckmann, Recklinghausen; Alfred Bilsing; Klaus Stanzel, both of Attendorn, Fed. Rep. of Germany

[73] Assignee: THR-Bilsing GmbH, Recklinghausen, Fed. Rep. of Germany

[21] Appl. No.: 847,898

[22] Filed: Mar. 6, 1992

[30] Foreign Application Priority Data

Mar. 7, 1991 [EP] European Pat. Off. ........ 91103456.9

[51] Int. Cl.$^5$ .............................................. B25T 18/04
[52] U.S. Cl. ................................. 414/680; 414/744.3; 414/744.6; 414/753; 901/18
[58] Field of Search ............... 414/744.2, 744.3, 744.5, 414/744.6, 753, 751, 680; 901/15, 17, 18; 74/469

[56] References Cited

U.S. PATENT DOCUMENTS

| | | | |
|---|---|---|---|
| 3,095,982 | 7/1963 | Weiser | 414/744.5 X |
| 3,984,009 | 10/1976 | Holroyd | |
| 4,095,481 | 6/1978 | Kasai et al. | |
| 4,113,033 | 9/1978 | Lindblad | 901/15 X |

FOREIGN PATENT DOCUMENTS

| | | |
|---|---|---|
| 2834244 | 2/1980 | Fed. Rep. of Germany . |
| 3024432 | 2/1980 | Fed. Rep. of Germany . |
| 2612826 | 9/1988 | France . |
| 2053148 | 2/1981 | United Kingdom ............. 414/744.5 |
| 2232655 | 12/1990 | United Kingdom . |

Primary Examiner—Michael S. Huppert
Assistant Examiner—Donald W. Underwood
Attorney, Agent, or Firm—Herbert Dubno

[57] ABSTRACT

A transporter or transport robot especially for transporting workpieces between presses has a cantilever arm swingable about a vertical first axis on a stationary base and a horizontal second axis in a common plane. A linear positioner is swingable at a free end of this cantilever arm about a vertical third axis and carries a gripper head on which the gripper is mounted for rotation about further axes. The workpiece can thus be swung across the first vertical axis to maintain its position along a line between the presses if the linear positioner and cantilever arm will swing in opposite senses. The actuator for the angular displacement may be electrical or hydraulic and a linear motor can be provided for the linear positioner.

12 Claims, 2 Drawing Sheets

TRANSPORTER, ESPECIALLY FOR TRANSPORTING A WORKPIECE BETWEEN PRESSES

FIELD OF THE INVENTION

Our present invention relates to a transporter, i.e. a transporting robot, especially for the transporting of workpieces between presses and, more particularly, to a transporter provided with a gripper hand or like device for engaging a workpiece and manipulating it, i.e. rotating and positioning it, and which can be used to remove a workpiece from one place in which initial forging or deep drawing or a like press operation takes place and inserting it into another press for a successive press operation. Naturally the manipulator can be used to position other workpieces with respect to other machine tools and to remove workpieces from a supply station for delivery to a receiving station and can take up workpieces from a feed station. The invention is also applicable to the manipulation of things other than workpieces, for example, tools.

BACKGROUND OF THE INVENTION

As will be apparent from German Patent 30 24 432, transporters for workpieces between presses may comprise a first pivotal drive about a vertical axis, a second pivotal drive about a horizontal axis and a generally horizontal cantilever arm which can be so displaced and which may be provided with a linear positioner displaceable horizontally upon this arm and carrying a gripper head which is provided with the gripper hand rotatable or swingable about at least one other axis on the gripper head.

Such workpiece manipulators are utilized widely in the automotive industry and the effect of the linear positioner is to allow the horizontal cantilever arm to have its effective length, i.e. the distance between its gripper head and its horizontal pivot, increased or decreased as required for the proper positioning of the workpiece. The horizontal positioner is generally fixed on the horizontal cantilever arm or is so integrated in it that it can only shift along the linear extent of that arm.

Even with optimum positioning and programming of such a manipulator, because the gripper head cannot be brought closer than a certain distance from the vertical pivot axis of the cantilever arm, the prior art manipulator has been found to be only limitedly successful.

OBJECTS OF THE INVENTION

It is, therefore, the principal object of the present invention to provide an improved transporter, especially for the transfer of workpieces between presses, whereby this limitation in the utility or versatility of earlier manipulators can be obviated.

It is, moreover, an object of the invention to provide an improved device of the aforedescribed type whereby the gripper head can have optimal mobility and which, therefore, is of increased versatility over conventional workpiece manipulators.

Still another object of the invention is to provide a workpiece manipulator which is free from drawbacks of prior art systems and which, moreover, can improve upon the ability of the manipulator to deliver a workpiece to any location within the angular range of the manipulator.

SUMMARY OF THE INVENTION

These objects and others which will become apparent hereinafter are attained, in accordance with the invention, by providing the linear positioner so that it is swingable on the cantilever arm about a third generally upright axis located at the end of this cantilever arm remote from its pivot to its support and thus at a location spaced from the vertical axis of the arm itself and so that the linear positioner and the gripper head of the manipulator clear the cantilever arm in relative swinging movement thereof so that, for example, the gripper head can be swung back over the arm and its vertical pivot freely.

More particularly, the transporter of the invention comprises:

a stationary base;

a support mounted on the base for rotation about a vertical first axis;

a cantilever arm mounted at one end on the support for pivotal movement about a horizontal second axis and having another end spaced from the support, the cantilever arm being capable of assuming a substantially horizontal position;

a pivot body mounted on the other end of the cantilever arm for rotary movement thereon about a third generally upright axis;

a linear positioner on the pivot body displaceable linearly perpendicular to the third axis;

a gripper head on the linear positioner for linear displacement thereby, the gripper head and the linear positioner being so mounted on the pivot body that, upon rotation of the pivot body, the linear positioner and the gripper head clear the cantilever arm;

a gripper hand on the gripper head pivotable about at least one further axis thereon relative to the linear positioner; and respective actuators connected to the support, the arm and the pivot body for displacing same about the first, second and third axes.

With the transport robot of the invention, the pivot body is provided between the horizontal cantilever arm and the linear positioner so that this positioner defines a third axis or articulation between the variable length outer arm formed by the positioner and the inner arm formed by the cantilevered member. In this manner, an additional degree of freedom is provided for the movement of the gripper head with the result that the desired optimization of the mobility of the workpiece is obtained.

For example, the gripper head may be swung out of a straight line extension of the horizontal cantilever arm back over the cantilever arm or the vertical pivot axis thereof to an orientation of the positioner 180° offset from its original position to increase the versatility of positioning of the head and hence a workpiece engaged thereby. The velocity of the gripper head can be increased by the vectoral addition of the individual velocities so that the range of speeds of the workpiece can be increased as is desirable in the transport of workpieces between presses. The structure of the manipulator can thus be of a lighter construction and the masses which are moved and the repositioning times can be reduced.

Preferably the vertical and horizontal pivot axes of the horizontal cantilever arm lie in a common plane.

It has also been found to be advantageous to provide the linear positioner as a rod or bar assembly displaceable in a bar guide on the aforementioned pivot body.

The gripper head can then be mounted at an end of the bar assembly. The various axes can be provided with hydraulic and/or electrical actuators or motors and, for the linear positioner, we may provide a linear motor.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
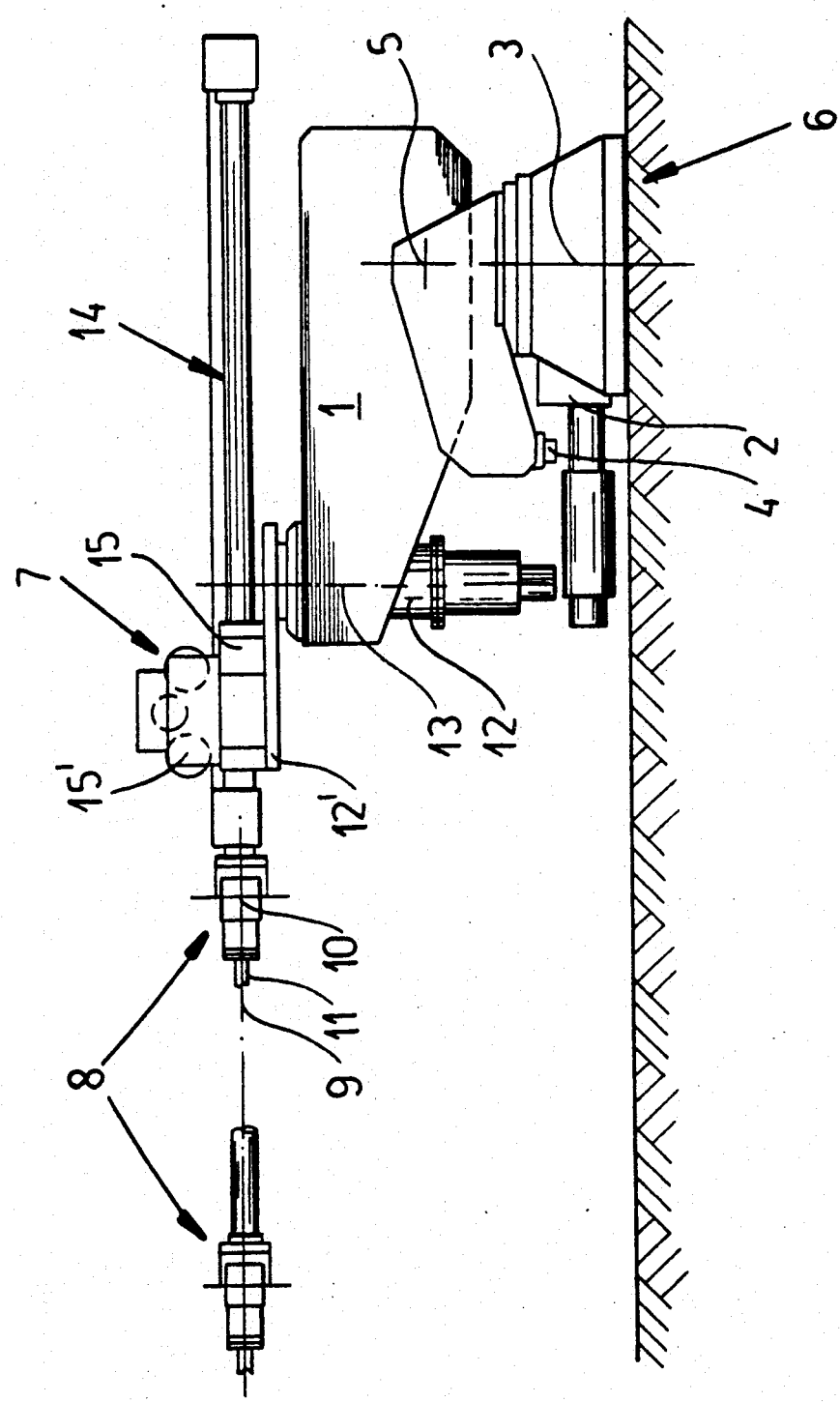
FIG. 1 is a side elevational view, in highly diagrammatic form of a workpiece transporter according to the invention.
Figure 2:
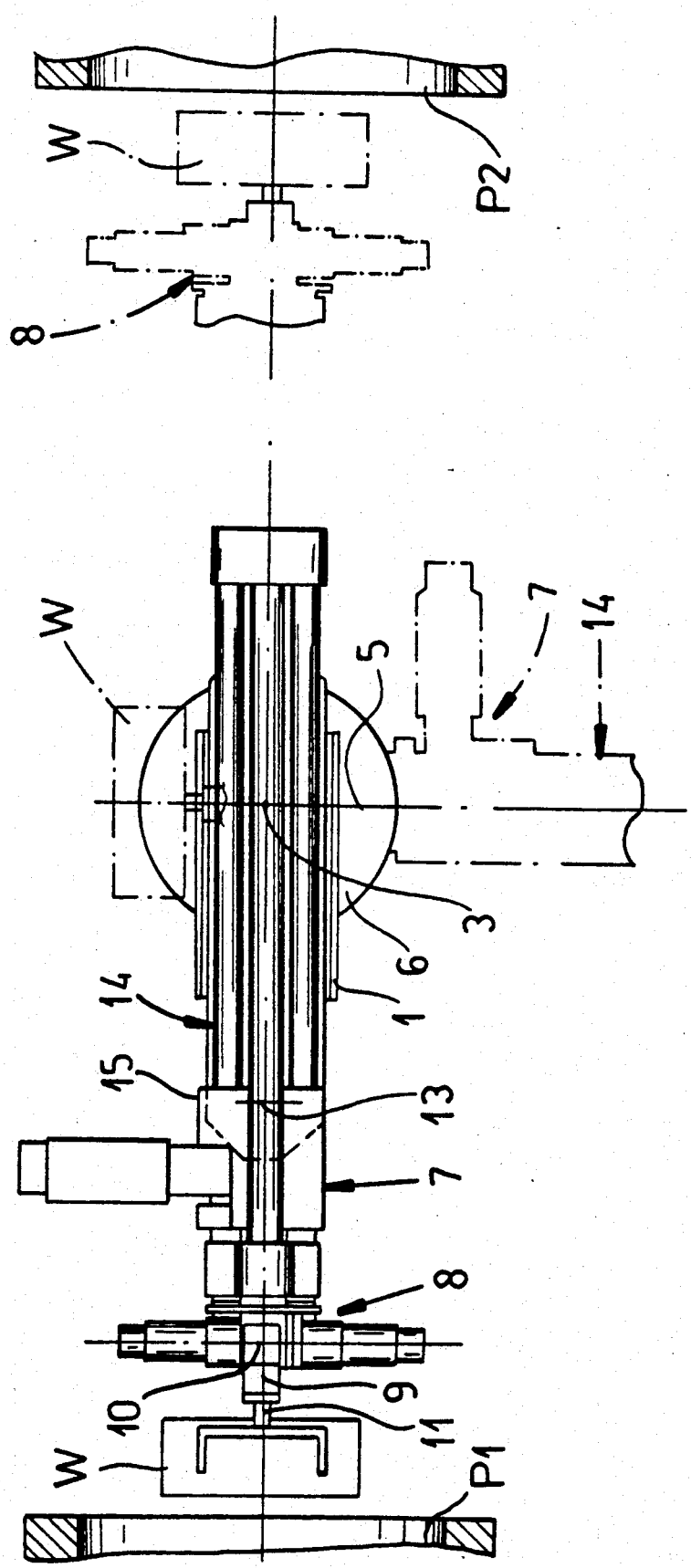
FIG. 2 is a plan view of the transporter of FIG. 1 in various positions.

The transporter or transport robot of FIGS. 1 and 2 can serve to transport workpieces W between press P1 and P2 (see FIG. 2).

The transporter basically comprises a cantilever arm 1 which, while permitted to assume a position inclined to the horizontal, generally remains recumbent and therefore is referred to as a horizontal cantilever arm. At one end, the horizontal cantilever arm 1 is swingable about a vertical axis 3 on a swing drive 2 including a support displaceable about this first vertical axis on a machine base 6 which is stationary.

On the support for swing drive 2 via a second pivot drive or actuator 4, the arm 1 is swingable about a horizontal axis 5.

The linear positioner 7 is mounted on the horizontal cantilever arm 1 and has a gripper head 8 at one end thereof.

The gripper head 8 defines an axis 9 of rotation of the gripper hand 11 which is parallel to the linear direction of displacement of the linear positioner, and an axis 10 for the hand which is perpendicular to the axis 9 and, in the embodiment shown, is parallel to the axis 5.

In the horizontal position of the arm 1, therefore, the linear positioner 7 can displace the head and its hand horizontally back and forth while the gripper hand 11 can seize the workpiece W and rotate the workpiece about the axis 9, swinging the workpiece up and down about the axis 10.

The end positions of the gripper head 8 or the gripper hand 11 on the linear position 7 have been shown in FIG. 1.

According to the invention, the linear positioner 7 is swingably mounted, at a distance from the vertical axis 3 of the horizontal cantilever arm 1, on this arm at its end remote from its supported end on a pivot body 12 forming a third pivot drive 12 about an upright axis represented at 13 and which is vertical in a horizontal position of the horizontal cantilever arm 1. The pivot body 12', the linear positioner 7 and the gripper head 8 are so constructed that relative swinging movement of the horizontal gripper arm on the one hand and of the linear positioner 7 and the gripper on the other that they clear one another. In other words, the cantilever arm 1 on the one hand and the linear positioner 7 and the gripper head 8 lie at different levels or heights.

As can be seen from FIG. 1, the vertical and horizontal axes 3 and 5 of the cantilever arm 1 lie in a common plane which is perpendicular to the plane of the drawing. The linear positioner 7 carries at one end the gripper head 8 and is a bar assembly 14 guided in a bar guide 15 of the pivot body 12'. The bar arrangement can be driven by a linear motor 15' of the guide 15 back and forth.

FIG. 2 shows a cycle of movement of the transporter in the transporting of a workpiece W between 2 presses P1 and P2. The gripper hand 11, which can be opened and closed by conventional clamping actuators not shown, engages the workpiece W in the left hand press P1 (FIG. 2) and the linear actuator 7 draws the workpiece W out of the press P1 to the right.

If the workpiece clears the press P1 and simultaneously with linear displacement to the right, or thereafter, the horizontal cantilever arm is swung in the clockwise sense about the vertical axis 3. This generates a centrifugal movement of the workpiece in the clockwise sense. Simultaneously, the linear positioner 7 can be rotated about the vertical axis 13 in the counter clockwise sense and the linear positioner further retracted to cause the gripper head 8 to swing over the pivot axis 3 as is apparent from FIG. 2.

With the workpiece W positioned ahead of the second press P2, the linear positioner 7 displaces this head to the right to deliver the workpiece W to the second press. As a consequence, the workpiece W is displaced only along a substrate line between the press while being swung around 180°.

The actuators that include drive 2 for the displacement about the vertical axis 3, 4 drive for displacement about the horizontal axis 5 and drive 12 for displacement about the axis 13 may be electrical and/or hydraulic drives of any conventional design including electric motors, electrically controlled hydraulic motors or hydraulically controlled hydraulic motors.

We claim:

1. A transporter for handling a workpiece, especially to transport a workpiece between presses, comprising:
    a stationary base;
    a support mounted on said base for rotation about a vertical first axis;
    a cantilever arm mounted at one end on said support for pivotal movement about a horizontal second axis and having another end spaced from said support, said cantilever arm being capable of assuming a substantially horizontal position over said stationary base;
    a pivot body mounted on said another end of said cantilever arm for rotary movement thereon about a third generally upright axis;
    a linear positioner on said pivot body displaceable in a plane linearly perpendicular to said third axis;
    a gripper head on said linear positioner for linear displacement thereby, said gripper head and said linear positioner being so mounted on said pivot body that, upon rotation of said pivot body, said linear positioner and said gripper head clear said cantilever arm;
    a gripper hand on said gripper head pivotable about at least one further axis thereon relative to said linear positioner; and
    respective actuators connected to said support, said arm and said pivot body for displacing same about said first, second and third axes.

2. The transporter defined in claim 1 wherein said first and second axes lie in a common plane.

3. The transporter defined in claim 2 wherein said linear positioner includes a bar unit carrying said head at one end thereof and a bar guide on said pivot body.

4. The transporter defined in claim 3 wherein said linear positioner is provided with an energizable actuator.

5. The transporter defined in claim 4 wherein said actuator of said linear positioner is a linear motor.

6. The transporter defined in claim 4 wherein said actuators ar at least in part electrically energizable actuators.

7. The transporter defined in claim 4 wherein said actuators are at least in part hydraulic actuators.

8. The transporter defined in claim 1 wherein said linear positioner includes a bar unit carrying said head at one end thereof and a bar guide on said pivot body.

9. The transporter defined in claim 1 wherein said linear positioner is provided with an energizable actuator.

10. The transporter defined in claim 9 wherein said actuator of said linear positioner is a linear motor.

11. The transporter defined in claim 1 wherein said actuators are at least in part electrically energizable actuators.

12. The transporter defined in claim 1 wherein said actuators are at least in part hydraulic actuators.

* * * * *